United States Patent [19]

Hammer

[11] 4,157,428
[45] Jun. 5, 1979

[54] ETHYLENE CARBON MONOXIDE COPOLYMERS CONTAINING EPOXY SIDE GROUPS

[75] Inventor: Clarence F. Hammer, Wilmington, Del.

[73] Assignee: E. I. Du Pont de Nemours and Company, Wilmington, Del.

[21] Appl. No.: 774,435

[22] Filed: Mar. 4, 1977

Related U.S. Application Data

[63] Continuation-in-part of Ser. No. 681,741, Apr. 29, 1976, abandoned, which is a continuation-in-part of Ser. No. 580,515, May 23, 1975, abandoned.

[51] Int. Cl.² ............................ C08J 5/18; C08J 5/00; C08J 9/00; C08G 8/28
[52] U.S. Cl. ............................ 521/134; 260/830 TW; 260/831; 260/834; 260/836; 260/848; 260/854; 521/135; 521/136; 521/138; 521/139; 521/140; 526/209; 526/218; 526/273; 528/361; 528/362; 528/365; 528/366; 528/392; 528/393
[58] Field of Search ................. 260/2.5 EP, 830 TW, 260/831, 834, 836, 854, 848; 526/11.1, 273, 11.2

[56] References Cited

U.S. PATENT DOCUMENTS

| | | | |
|---|---|---|---|
| 3,201,497 | 8/1965 | Heino | 260/836 |
| 3,438,931 | 4/1969 | Mitchell et al. | 260/848 |
| 3,526,538 | 9/1970 | Lindemann et al. | 526/273 |
| 3,526,540 | 9/1970 | Lindemann | 526/273 |
| 3,639,365 | 2/1972 | Adelman | 526/273 |
| 3,723,570 | 3/1973 | Adelman | 526/273 |
| 3,780,140 | 12/1973 | Hammer | 260/17 R |
| 3,781,380 | 12/1973 | Labana et al. | 260/42.21 |
| 3,843,594 | 10/1974 | Labana et al. | 260/42.18 |
| 3,935,374 | 1/1976 | Yoshikawa et al. | 526/273 |
| 3,935,375 | 1/1976 | Ichiba et al. | 526/273 |
| 3,948,832 | 4/1976 | Hudgin | 260/23 EP |

*Primary Examiner*—Herbert J. Lilling

[57] ABSTRACT

New and useful blends of thermosetting resins with copolymers of certain amounts of ethylene with another monomer copolymerizable therewith to provide solid but flexible polymers, and a third monomer containing epoxy side groups, and optionally carbon monoxide, are provided. These blends result in performance unattainable with the thermosetting resin alone in terms of flexibility, toughness, and adhesion. Such blends may be used, for example, to produce flexible, semirigid or rigid films, coatings, fibers, foams or molded articles.

62 Claims, No Drawings

ETHYLENE CARBON MONOXIDE COPOLYMERS CONTAINING EPOXY SIDE GROUPS

CROSS-REFERENCE TO RELATED APPLICATION

This application is a continuation-in-part of copending application Ser. No. 681,741, filed Apr. 29, 1976, now abandoned which is a continuation-in-part of application Ser. No. 580,515, filed May 23, 1975 now abandoned.

BACKGROUND OF THE INVENTION

1. Field of the Invention

This invention relates to blends of ethylene copolymers, curable compositions, and shaped articles formed therefrom. More particularly this invention relates to blends of thermosetting resins with copolymers of ethylene, a flexibilizing monomer, a third monomer which contains epoxy side groups, and optionally carbon monoxide. This invention also relates to shaped articles, films, and fibers formed from such blends.

2. Description of the Prior Art

Ethylene polymers are characterized by a low polarity and low reactivity. They are like waxes in this respect, having a low dielectric constant and being soluble in hot oils, hot wax and hot hydrocarbons. They also are well known to be very inert. For some uses it is desirable to modify the ethylene polymers to make them flexible, to impart more polarity to the polymers, and to be able to use them in reaction with other resins. A small degree of polarity and a certain amount of flexibility can be imparted to an ethylene polymer by incorporation therein of unsaturated organic esters, such as vinyl acetate or acrylates. However, to obtain a high degree of polarity high levels of ester are required which in turn adversely affects the inherit advantage of the long ethylene chain, e.g., low cost, good low temperature behavior, etc. Thus it is desirable to increase the polarity of an ethylene copolymer while retaining the hydrocarbon chain as the major feature of the polymer. Ethylene copolymers, however, modified to be more flexible and more polar may still be relatively unreactive.

The art regarding thermosetting resins and especially blends with other polymers will now be considered. Commercially available thermosetting resins such as phenolics, epoxys, etc., have been found to be useful because of the retention of their performance at elevated temperatures. This retention of performance is associated with the cross-linking or curing action inherent in the structure of the thermosetting resins utilized. However, this retention of high temperature performance is accompanied by high stiffness and brittleness making it desirable to lower the stiffness of such material or if some stiffness is desired by providing a higher degree of toughness. The obvious solution, to blend a flexible polymer into the thermosetting resin, has not been successful to the best of our knowledge. Molecular compatibility has not been achieved; the desirable properties of the thermoset are lost.

SUMMARY OF THE INVENTION

According to the present invention there are provided curable blends of 1 to 99 percent by weight of solid organic thermosetting resins taken from the class consisting of phenolic resins, e.g., phenol formaldehyde resins; epoxy resins, and melamine formaldehyde resins with 1 to 99 percent by weight of copolymers consisting essentially of, by weight (a) 40 to 90 percent ethylene; (b) 0 to 20 percent carbon monoxide; (c) 5 to 40 percent of a monomer copolymerizable therewith to provide flexible polymers, said monomer taken from the class consisting of unsaturated mono- or dicarboxylic acids of 3 to 20 carbon atoms, esters of said unsaturated mono- or dicarboxylic acids, vinyl esters of saturated carboxylic acids where the acid group has 1 to 18 carbon atoms, vinyl alkyl ethers where the alkyl group has 1 to 18 carbon atoms, acrylonitrile, methacrylonitrile, alpha-olefins of 3 to 20 carbon atoms, norbornene and vinyl aromatic compounds; and (d) 0.2 to 15 percent of an ethylenically unsaturated monomer of 4 to 21 carbon atoms containing an epoxy group.

The term "phenolic resins" is meant to include thermosetting phenol-aldehyde resins, e.g., those made from phenol, cresol, e.g., m-p-cresol mixture, p-cresol or cresylic acid, resorcinol with aldehydes such as formaldehyde and furfural. The one-step type (resoles) or the two-step type (novalaks) are useful (U.S. Pat. No. 3,438,931). Also useful are phenol-formaldehyde resins modified with alkyl phenols (e.g., cresols), polyhydric phenols (e.g., resorcinol, hydroquinone, etc.), or polyphenols (e.g., Bisphenol-A). Preferred blends contain copolymers of (a) ethylene, (b) carbon monoxide, (c) a monomer copolymerizable therewith taken from the class consisting of vinyl alkanoates, e.g., vinyl acetate, vinyl propionate, vinyl butyrate; alkyl acrylates and alkyl methacrylates wherein alkyl is from 1 to 20 carbon atoms; and (d) an epoxy-containing monomer taken from the class consisting of epoxy esters of copolymerizable unsaturated organic acids, epoxy ethers of vinyl ethers and allyl ethers and mono-epoxy substituted diolefins of 4 to 12 carbon atoms.

A specific preferred blend contains a copolymer of (a) ethylene, (b) carbon monoxide, (c) vinyl acetate, and (d) glycidyl acrylate or methacrylate.

Another specific preferred blend contains a copolymer of (a) ethylene, (b) vinyl acetate and (c) glycidyl acrylate or methacrylate.

The copolymers in the preferred blends contain the following weight percent of components (a) to (d):

(a) 45 to 90, more preferably, 50 to 70.
(b) 0 to 15, more preferably, 0 to 3 or 10 to 15.
(c) 10 to 33, more preferably, 20 to 30.
(d) 0.4 to 9, more preferably, 1.5 to 6.

The copolymers normally have a melt index within the range of 0.1 to 3,000; preferably 5 to 500.

The above curable blends may be formed into a sheet, a block for molding purposes, or a fiber before the blends are cured. The curable blends can be a solid form which is grindable into a powder and then formed into a molding or shaped article, into a film, a coating, or into a fiber before curing.

Cured compositions, in the forms described above, result from heating, e.g., oven, mold, etc., the above curable blends.

DETAILED DESCRIPTION OF THE INVENTION

The poor performance of thermosetting resins such as phenolics is generally exhibited by a high degree of brittleness. This is usually exhibited either by a brittle failure from a high speed impact, or by a brittle failure at low strains under a slow speed test such as bending. In actual use, this may occur with the dropping of a molded object such as a bottle cap to the floor, the twisting of a toy, or even by slight thermal strains. The latter occur regularly on a molded piece with metal inserts which might be used under the hood of a car.

In order to demonstrate the present invention it is necessary to reduce the qualitative brittleness problems described above to quantitative laboratory measurements. In slow-rate flexural measurements we have found that conventional filled phenolics and epoxies fail when the strain on the sample is as little as about 1%. For practical purposes, raising the level of strain to failure by 2–3 fold; i.e., to 2–3% is a major accomplishment.

For impact measurements, the notched Izod test has been chosen. In this test, the ability of the molded piece to absorb impact energy is measured. Conventional filled phenolic molding resins show very low values, say 0.1 to 0.3 ft-pounds per inch of notch, when the sample is broken. This value depends upon the type or combination of filler. It can be increased by modifying the structure with more expensive phenolics, or by using fillers such as long glass fibers or cotton floc. Resins using these types of fillers are provided on a commercial basis, but are not used extensively because of the high cost of making the blend, and difficulties in actual use of the commercial product.

Thus there has continued to be a need for a resin modifier which can be added to the thermosetting molding compound to increase its toughness.

This invention requires and depends upon the compatibility of the modifying resin with the thermosetting resin. There are two types of compatibility involved in this invention and at two stages in use, before and after curing.

One type of compatibility is the most common one, where the blends of the two resins are completely miscible on a molecular scale, and give clear films. This invention encompasses that type of compatibility as described herein.

This invention also requires and depends on a second and lower degree of compatibility which is also important. It is often possible to blend two resins and find them to appear to be incompatible as evidenced by the two-phase opacity of a molded film. Nevertheless we find that the blend is strong and tough; the two resins are functionally compatible. This functional compatibility occurs because the two phases are interdependent and not pure phases of the starting resins. Each phase contains a small amount of the other resin. In fact in molten two-phase blends of this type there is an equilibrium condition with a constant migration of molecules across the phase boundaries. One theory suggests that the cooled sample has some molecules trapped part way across the boundary and thereby imparting the improved mechanical performance.

Most polymer/polymer blends do not exhibit this functional compatibility. Blends such as polyvinyl chloride with polystyrene seem to show no molecular interdependence in the melt and do in fact show extremely friable, brittle opaque films. This behavior is the general case. It is part of this invention to tailor the structure of the modifying resin to the structure of the uncured thermosetting resin to give good melt working characteristics and functional compatibility.

It is also essential to this invention that the compatibility not be destroyed by the curing process. It is possible to devise a polymer-resin blend which is completely compatible (clear) before curing, but which becomes two-phase (opaque) after curing. The molecular motion which occurs during the curing process enables the resin molecules to achieve the best position for the chemical curing, and at the same time rejects the modifier molecules into a separate, second phase.

An essential part of this invention is the incorporation in the modifier molecule of a site which cocures with thermosetting resin. Such a site is essential for both the completely compatible blends and the functionally compatible blends of the present invention.

The copolymers in the blends of this invention consist essentially of the above described amounts of ethylene, carbon monoxide and monomers (c) and (d) which are copolymerizable ethylenically unsaturated organic compounds. Monomers (c) are selected from the class consisting of unsaturated mono- or dicarboxylic acids of 3 to 20 carbon atoms, esters of such unsaturated mono- or dicarboxylic acids, vinyl esters of saturated carboxylic acids where the acid group has 1 to 18 carbon atoms, vinyl alkyl ethers where the alkyl group has 1 to 18 carbon atoms, acrylonitrile, methacrylonitrile, and copolymerizable unsaturated hydrocarbons, such as alpha-olefins of 3 to 20 carbon atoms, ring compounds, such as norbornene, and vinyl aromatic compounds. Vinyl acetate is preferred monomer (c).

Monomers (d) are ethylenically unsaturated monomers of 4 to 21 carbon atoms which contain an epoxy group. Such monomers are taken from the class consisting of epoxy esters of copolymerizable unsaturated organic acids, e.g., acrylic or methacrylic; the epoxy ethers of vinyl ethers and allyl ethers, e.g., glycidyl vinyl ether, vinyl cyclohexane monoxide, etc., or the mono-epoxy substituted di-olefins of 4 to 12 carbon atoms. Glycidyl acrylate and methacrylate are preferred monomers (d).

In preparing the copolymers of the present invention, commercially available ethylene, carbon monoxide and unsaturated monomers (c) and (d) of about 100 percent purity are used initially and in supplying continuous make-up for the polymerization feed stream. The reactor vessel used is capable of withstanding high pressures and temperatures, and is equipped with a high speed motor-driven stirrer and pressure relief valves, as well as jacketed walls for circulating heating or cooling fluids in order to control temperature. Carbon monoxide and the other monomers are pumped into the ethylene monomer feed stream at the pressure of the reactor, and then the mixture of monomers is pumped at reactor pressure into the reactor, either together or separately. Catalyst, as necessary, is pumped into the reactor through a separate feed line.

A mixture of copolymer and monomer exits the reactor, and the pressure is reduced as the mixture flows into a separator. Monomers leave the separator and are either destroyed or pumped for recycle to the reactor together with make-up monomers. Molten copolymer leaves the separator in a stream, from which it is cooled and further processed, e.g., the copolymer may be cut into suitable sized particles and put into suitable containers for shipping.

The flow of ethylene, carbon monoxide, monomers (c) and (d) and catalyst into the reactor is carefully controlled so that they enter the reactor in constant continuous molar ratios and at the same continuous rate at which product and unreacted monomers are discharged from the reactor. The rates and molar ratios are adjusted so as to provide in the product copolymer, by weight, 40 to 90 percent ethylene, 0 to 20 percent carbon monoxide, 5 to 40 percent of monomer (c) and 0.2 to 15 percent monomer (d). Effective stirring, usually at a rate of at least 0.25 horsepower per gallon of reactor volume, is provided in order to keep the reacting monomers in intimate admixture throughout the reactor. The reactor temperature should be at least 140° C. It is preferred that the reactor temperature be maintained within the range of about 155°–300° C., most preferably 155°–225° C., and that the reactor pressure be maintained within the range of 5000–60,000 psi, preferably about 20,000–35,000 psi.

It is important in preparing the copolymers of the present invention that the contents of the reactor be kept uniform with respect to the weight ratios of ethylene, carbon monoxide and monomers (c) and (d) to produce the solid copolymers of the present invention. None of the monomers should be depleted so that not less than all of the monomers are reacting. Since the various monomers react at different rates, a larger percentage of faster reacting monomers will react in a given time. Consequently, the ratio of feed rate for the monomers will be different from the desired ratio of those monomers in the copolymer produced. Thus, carbon monoxide reacts at a rate about five times that of ethylene, so that when 10 percent of the ethylene present has been incorporated in polymer, about 50 percent of the carbon monoxide present is in polymer. Conditions required to produce specific copolymers vary, depending on the reactivity of monomers (c) and (d), e.g., vinyl acetate reacts at about the same rate as does ethylene, whereas other monomers such as methyl methacrylate react about as fast as or faster than carbon monoxide. The epoxy-containing monomers (d) may react at rates which vary between the speed of reaction of ethylene and carbon monoxide.

The free-radical polymerization catalyst employed in the process can be any of those commonly used in the polymerization of ethylene, such as the peroxides, the peresters, the azo compounds, or the percarbonates. Selected compounds within these groups are dilauroyl peroxide, ditertiary butyl peroxide, tertiary butyl perisobutyrate, tertiary butyl peracetate, α, α-azobisisobutyronitrile and other compounds of comparable free-radical activity. Usually the catalyst will be dissolved in a suitable inert organic liquid solvent such as benzene, kerosene, mineral oil or mixtures of solvents. The usual catalyst level is used, i.e., about 25 to 2500 ppm. preferably about 75 to 500 ppm, based on the weight of the monomers fed to the reactor.

For the purpose of this invention it is desirable to understand the nature of blends of two molten polymers as the blending is affected by the molecular nature of high polymers. Thermosetting resins, such as phenolic resins, are produced as medium molecular weight polymers for processing into the desired form prior to the curing step. (These resins are not formable after curing.) When one melts an uncured thermosetting resin and attempts to blend in a molten thermoplastic resin, the dispersion of the thermoplastic polymer is accomplished through a shearing of the molten thermosetting resin. In order to disperse the molten thermoplastic polymer into very small droplets there must be an interaction between the two molten polymers at their mutual interface, so that the shear forces in the molten thermosetting resin can act on the molten thermoplastic resins. This is accomplished when each polymer is partially soluble in the other. Otherwise the thermoplastic resin remains in the liquid as relatively large particles. The first requirement in this invention, then, is the discovery of the molecular structure which will provide a thermoplastic resin which is partially soluble in the liquid thermosettable resin.

The curing of a thermosetting resin occurs by the chemical linking of the thermosettable molecules through sites which occur on the average at more than two per molecule. When a nonreactive thermoplastic polymer is dissolved in the thermosetting resin, these thermosettable molecules move around rapidly during curing to exclude the thermoplastic polymer. The thermoplastic polymer is thereby forced out of the solidifying thermosetting composition. As a result a two phase system is formed. One phase is the rigid brittle thermosetting matrix. The second phase consists of the previously dissolved thermoplastic resin. The second requirement of this invention, then, is the incorporation of a reactive epoxy group in the thermoplastic copolymer which will provide a site through which the thermoplastic copolymer participates in the curing step. The thermoplastic copolymer is thereby intimately bound into the matrix of the cured thermosetting resin.

To summarize, the thermoplastic resin is intended to act as a useful modifier for the thermosetting resin. To be effective, it must be partially dispersed on a molecular scale, i.e., partially dissolved in the thermosetting resin before the cure; and it must remain substantially dispersed in the thermosetting resin after cure.

Another point which must be recognized is that there are two useful degrees of dispersion in terms of the description above. One is when the thermoplastic resin is so well dispersed, after cure, that the resultant blend is clear. A molded cured film from such a blend is more flexible than the unmodified thermosetting resin. It has a modest and useful degree of elongation before the sample fails; but when the sample does fail, it fails in a brittle fashion without much absorption of energy. It is well known in the art, however, that rubbery impact modifiers for rigid thermoplastic resins should be finely dispersed as a separate phase which is intimately bonded to the rigid phase.

Thermosetting resins, on the other hand, are much more difficult to toughen. The present invention embodies the discovery of adjusting the structure of the copolymers to achieve the same type of effect; i.e., the copolymers of the present invention can be adjusted so they dissolve only partially in the uncured thermosetting resin. Then, after curing, the tiny agglomerates of the thermoplastic resin of the present invention are capable of absorbing impact energy, but do so, in fact, only because they are also bonded through reactive sites to the molecules of the cured thermosetting matrix.

The copolymers described above can be used to make curable blends with effective amounts of solid organic thermosetting resins taken from the class consisting of phenolic resins, e.g., phenol formaldehyde resins; epoxy resins, and melamine formaldehyde resins. The term "phenolic resins" is meant to include thermosetting phenol-aldehyde resins, e.g., those made from phenol, cresol, e.g., m-p-cresol mixture, p-cresol or cresylic acid, resorcinol with aldehydes such as formaldehyde and furfural. The one-step type (resoles) or the two-step type (novalaks) are useful (U.S. Pat. No. 3,438,931). Also useful are phenol-formaldehyde resins modified with alkyl phenols (e.g., cresols), polyhydric phenols (e.g., resorcinol, hydroquinone, etc.), or polyphenols (e.g., Bisphenol-A).

These curable blends may comprise 1 to 99 percent of the above copolymers and 1 to 99 percent of the thermosetting resins. Preferably the copolymer is present in the blend in a percent of 5 to 95 and the thermosetting resin is present in the blend in a percent of 5 to 95. A particularly preferred percentage range for the copolymer is 10 to 50 percent, and the thermosetting resin is 90 to 50 percent.

The curable blends described herein may be filled with the conventional fillers used in thermosetting systems. These fillers may be wood flour, asbestos, silica, fiberglass, cotton flock, mica, macerated fabric and cord, rag, carbon black, or metal, such as iron, lead, copper, etc. The curable blends may be used to produce flexible, semirigid or rigid films, coatings, fibers, molded articles, foamed articles and adhesives.

EXAMPLES OF THE INVENTION

The following Examples illustrate the invention wherein the percentages are by weight unless indicated.

EXAMPLES 1 to 14

Copolymers of ethylene, carbon monoxide, vinyl acetate, and a fourth comonomer as specified in Table I were prepared by mixing the respective monomers at the feed rates shown in Table I, then feeding the resultant mixture into a 700 cc highly stirred reaction vessel together with a catalyst of the type and amount given in Table I.

The reactor pressures and temperatures and the conversion of monomer to polymer are also given in Table I. The reactor residence time was 4.5 minutes. The melt index of the polymer reported in Table I was determined according to ASTM D1238-65T, Condition E.

minutes at 165° C. in the press at a pressure of 20,000 psi. The cured film from this blend was clear, indicating good compatibility, and could be bent almost 180° before breaking.

This result is in contrast to the behavior of a film from the straight cured novalak phenolic resin, which is very brittle and breaks under a very small strain.

The compatible nature of this blend is in contrast to that encountered using an ethylene/vinyl acetate/glycidyl methacrylate copolymer, into which no carbon monoxide was copolymerized. An opaque incompatible blend was obtained when this second copolymer was used, indicating the essential nature of the carbon monoxide constituent when clear films are desired. The comonomer ratio of this copolymer was 71/22/7.

EXAMPLE 16

A solution blend was made containing 35% of the polymer of Example 2 and the novalak phenolic resin of Example 15. The blend was pressed into a 3"×3"×⅛" bar and cured for 10 minutes at 150° C. This bar was cut into bars 2½"×½"×⅛". The Izod impact strength of these bars was 0.39 ft. lb./inch compared to a value of 0.25 ft. lb./inch for the unmodified phenolic resin.

EXAMPLE 17

A 50/50 blend was made from solution using the copolymer of Example 3 and the novalak resin of Example 15. The uncured film, cast from the solution, was clear, indicating compatibility. The film was cured in an air oven at 110° C. for 20 min. to give a clear, flexible film. The film could be bent double and creased without cracking.

This cured film was placed in a beaker containing

TABLE I
COPOLYMER SYNTHESIS

| | Product Copolymer | | | Reaction Conditions | | | | Feed Ratio E/Comonomer (c)/ | Con- |
|---|---|---|---|---|---|---|---|---|---|
| Example No. | Copolymer Type | Monomer Ratio | Melt Index | Pressure (Atmos.) | Temp. (°C.) | Catalyst Type | Catalyst(a) Concentration | CO/Comonomer (d) (Parts by wt.) | version (%) |
| 1 | E/VA/CO/GMA | 60/25/13/2.4 | 52 | 1630 | 180 | PB | 0.40 | 11/4.1/0.35/0.19 | 10.2 |
| 2 | E/VA/CO/GMA | 53/30/11/5.6 | 660 | 1630 | 181 | PB | 0.30 | 10/5.0/0.53/0.21 | 11.8 |
| 3 | E/VA/CO/GMA | 52/27/13/8.4 | 45 | 1630 | 179 | PL | 0.42 | 10/4.9/0.43/0.20 | 10.4 |
| 4 | E/VA/CO/GMA | 56/26/15/3.1 | 50 | 1630 | 161 | PL | 0.56 | 10/4.4/0.35/0.11 | 11.0 |
| 5 | E/VA/CO/GMA | 61/21/15/3.0 | 94 | 1630 | 153 | PL | 1.30 | 10/3.1/0.42/0.096 | 9.9 |
| 6 | E/VA/CO/GMA | 64/21/10/5.4 | 70 | 1830 | 181 | RA55 | 0.59 | 10/3.2/0.20/0.14 | 11.5 |
| 7 | E/VA/CO/GMA | 62/22/10/6.0 | 58 | 1830 | 180 | RA55 | 0.59 | 10/3.3/0.22/0.15 | 10.8 |
| 8 | E/VA/CO/GMA | 67/17/10/5.9 | 84 | 1830 | 181 | RA55 | 0.82 | 10/2.6/0.22/0.15 | 11.1 |
| 9 | E/VA/CO/GMA | 67/17/10/5.8 | 96 | 1830 | 181 | RA55 | 0.88 | 10/2.6/0.17/0.15 | 11.6 |
| 10 | E/VA/CO/GA | 64/21/9/5.9 | 72 | 1830 | 180 | RA55 | 0.66 | 10/3.3/0.21/0.14 | 11.0 |
| 11 | E/VA/CO/GMA | 61/25/10/4.5 | 51 | 1830 | 180 | PO | 0.39 | 10/4.0/0.30/0.10 | 10.3 |
| 12 | E/VA/CO/GMA | 63/23/7/7.0 | 65 | 1830 | 174 | RA55 | 0.53 | 10/2.6/0.20/0.14 | 11.0 |
| 13 | E/VA/CO/GMA | 64/18/12/6.3 | 80 | 1830 | 180 | RA55 | 1.03 | 10/2.6/0.25/0.14 | 11.4 |
| 14 | E/VA/CO/GMA | 63/18/13/5.6 | 45 | 1830 | 180 | RA55 | 0.72 | 10/2.6/0.34/0.15 | 11.5 |

PB = t-Butyl Peroxyisobutyrate
PO = t-Butyl Peroctoate
(a)Lbs./M Lbs. polymer
PL = t-Butyl Peroxypivalate
RA55 = 2-t-Butyl Azo-2-Cyano-4-Methoxy-4-Methyl Pentane
GMA = Glycidyl Methacrylate
GA = Glycidyl Acrylate

EXAMPLE 15

A blend containing 15% of the copolymer of Example 2 with novalak phenolic resin (supplied by Durez Division of Hooker Chemical Company as Durez® 14000, a powdered 2-step type phenol-formaldehyde resin containing about 7% hexamethylenetetramine) was made by dissolving both polymers in tetrahydrofuran. The blend was dried on a steam plate and then pressed into a 2 mil film. The film was cured for 15 boiling acetone. This sample stayed as a film after stirring for 30 minutes, indicating a complete cure.

EXAMPLE 18

A 50/50 blend was made on a 2-roll mill at a temperature of 75° C. 15 Grams of the polymer of Example 3 was blended with 15 grams of a powdered 1-step type phenolic resin (resole) supplied as Durez® 26164. A 10 mil film was melt pressed from this blend and found to be hazy, indicating only partial compatibility. This blend was pressed into a bar and cured. The Izod impact strength of this bar was 2.5. This is a very high value for a cured polymer.

EXAMPLE 19

15 g. of the polymer of Example 3 was milled with 15 g. of a powdered two-step phenolic resin (novalak) Durez® 22091 sold by Hooker Chemical Company, which contained no curing agent. The blend was pressed into a 10 mil film and then held in the press at 150° C. for one (1) hour to cure. The film was clear, showing compatibility and was insoluble in boiling tetrahydrofuran showing a cure.

EXAMPLE 20

A solution 50/50 blend was made from the polymer of Example 3 and the novalak phenolic resin described in Example 15 containing 8 percent of hexamethylenetetramine. A 10 mil film was pressed at 100° C., the temperature was raised to 150° C. for 30 minutes. The film was clear.

The tensile properties of this film were: tensile strength, 2150 psi; elongation, 60 percent; tensile modulus, 18,000 psi. When the broken specimens were returned to the original positions, the elongation above was found to be >95% elastic (ASTM D-1708-66 [0.2"/min. crosshead speed]).

EXAMPLE 21

A solution blend in tetrahydrofuran was made using 0.5 g. of the polymer of Example 1 and 1.5 g. of liquid diglycidyl ether of bisphenol A with an epoxy equivalent weight of about 190 and a viscosity of about 13,000 cps. at 25° C. (Epon® 828 sold by Shell). 0.15 g. of a curing agent triethylenetetramine was added. The solution was evaporated to dryness to form a film. The film was cured by heating over a steam bath for one (1) hour. The film was clear and could be bent double with no indication of brittleness. This behavior was contrast to the brittle behavior of a control film made in the same fashion, but without the polymer of Example 1.

EXAMPLE 22

A solution blend was made in tetrahydrofuran of 50 percent of the polymer of Example 2 and 50 percent of a melamine-formaldehyde resin, hexamethoxymethylmelamine sold by American Cyanamid (Cymel® 301). p-toluene sulfonic acid was added to give 0.25 percent by weight, exclusive of the solvent, as a catalyst for cure. This solution was coated on aluminum, dried and cured at 150° C. for 1 hour. The film was very slightly hazy, flexible, and could be bent double without cracking.

A similar film containing only the melamineformaldehyde resin and catalyst was also coated on aluminum and cured. In contrast, this film was very brittle and cracked when the aluminum was bent.

TABLE II

| | Product Copolymer | | | Reaction Conditions | | | | | |
|---|---|---|---|---|---|---|---|---|---|
| Example No. | Copolymer Type | Monomer Ratio | Melt Index | Pressure (Atmos.) | Temp. (°C.) | Catalyst Type | Catalyst Concentration[2] | Feed Ratio E/Comonomer (c)/ CO/Comonomer (d) (Parts by wt.) | Conversion (%) |
| 23 | E/VA/CO/GMA | 70/18/9/3.5 | 60 | 1830 | 180 | RA-55 | .54 | 10/2.58/.17/.14 | 11.4 |
| 24 | E/VA/CO/AGE[1] | 68/17/12/2.9 | 40 | 1830 | 180 | RA-55 | .87 | 10/2.63/.45/.06 | 11.3 |
| 25 | E/MA[3]/CO/GMA | 72/11/13/4.2 | 45 | 1830 | 180 | RA-55 | 1.22 | 10/.25/.30/.11 | 10.8 |
| 26 | E/VA/CO/GMA | 68/22/8/2.9 | 400 | 1700 | 182 | RA-55 | 1.37 | 20/5.2/.30/.18 | 11.5 |
| 27 | E/VA/CO/GMA | 73/17/9/1.2 | 400 | 1700 | 181 | RA-55 | 1.89 | 20/6.6/.90/.21 | 11.0 |
| 28 | E/VA/CO/GMA | 62/21/14/3.2 | 500 | 1400 | 180 | RA-55 | 3.94 | 20/6.6/.90/.19 | 11.8 |
| 29 | E/VA/CO/GMA | 60/22/14/4.5 | 50 | 1830 | 181 | LUP 80 | 0.21 | 10/3.3/0.50/.12 | 12.6 |
| 30 | E/VA/CO/GMA | 64/29/4/3.3 | 350 | 1450 | 181 | RA-70 | .42 | 14/5.47/0.10/0.09 | 11.3 |
| 31 | E/VA/GMA | 65/31/4.5 | 50 | 1830 | 181 | RA-55 | .25 | 22/6.65/.18 | 12.2 |
| 32 | E/MA/GMA | 71/24/5.3 | 15 | 1830 | 180 | RA-55 | 1.59 | 10/.42/.10 | 10.7 |
| 33 | E/VA/GMA | 77/19/4.7 | 40 | 1830 | 181 | RA-55 | .53 | 10/2.5/.6 | 11.0 |
| 34 | E/VA/GMA | 71/24/4.2 | 60 | 1830 | 182 | RA-55 | .51 | 10/3.50/.11 | 11.8 |
| 35 | E/VA/GMA | 62/34/3.7 | 70 | 1830 | 181 | RA-55 | .41 | 10/5.65/.11 | 12.1 |
| 36 | E/VA/GMA | 64/30/6.2 | 40 | 1830 | 181 | RA-55 | .82 | 10/4.60/.18 | 11.6 |
| 37 | E/VA/GMA | 68/31/0.9 | 105 | 1830 | 176 | RA-55 | .08 | 14/5.40/.027 | 11.0 |
| 38 | E/VA/GMA | 65/33/2.0 | 90 | 1830 | 177 | RA-55 | .11 | 14/5.46/.058 | 11.3 |
| 39 | E/VA/AGE | 66/33/0.7 | 230 | 1830 | 170 | RA-55 | .25 | 14/5.53/.124 | 11.2 |
| 40 | E/MVE[4]/GMA | 66/26/8.1 | 1200 | 1700 | 160 | RA-55 | .23 | ~2/4.1/.08 | 11.9 |

LUP 80 = t-Butyl Peroxyisobutyrate
RA-55 = 2-t-Butyl Azo-2-Cyano-4-Methoxy-4-Methyl Pentane
RA-70 = 2-t-Butyl Azo-2-Cyano-4-Methyl Pentane
[1] allyl glycidyl ether
[2] lbs./M lbs. of polymer
[3] methyl acrylate
[4] methyl vinyl ether

EXAMPLES 23 to 40

Following the procedure of Examples 1 to 14 a series of tetrapolymers were prepared. Polymer compositions and reaction conditions are summarized in Table II.

CONTROL EXAMPLE 1 AND EXAMPLES 41 to 49

Blends of phenolic resins, based on a 50/50 blend of wood flour and a two-step (novalak) phenolic resin, were made. 8 parts of hexamethylenetetramine were added in the blending step to provide a cure catalyst. All blends contain 40% wood flour for comparative purposes. The polymer of this invention was added to replace a portion of the phenolic, except for Control Example 1 where additional amount of the novalak phenolic resin was used in place of the tetrapolymer of the present invention. Bars ⅛"×½"×5" were molded at 100° C. and cured at 160° C. for 10 minutes.

From the results shown in Table III, it can be seen that one can obtain a higher tensile strength and higher flexural strain at failure with only a minor decrease in modulus (Example 41); or one can obtain a marked increase in flexural strain at failure, a large reduction in modulus with a relatively minor decrease in flexural strength (Example 42 to 49).

TABLE III

| Example Number | Additive Type | Additive, Amount, % | Flexural Modulus $\times 10^{-3}$ psi | Flexural Strength $\times 10^{-3}$ psi | Flexural Strain at Failure, % |
|---|---|---|---|---|---|
| Control 1 | (Phenolic) | (20) | 1100 | 13 | 1.2 |
| 41 | Tetrapolymer of Example 28 | 20 | 800 | 14.5 | 1.9 |
| 42 | Tetrapolymer of Example 26 | 20 | 320 | 10 | 4.5 |
| 43 | Tetrapolymer of Example 30 | 20 | 230 | 6.6 | 3.9 |
| 44 | Terpolymer of Example 31 | 20 | 290 | 6.9 | 3.3 |
| 45 | Terpolymer of Example 32 | 20 | 270 | 6.9 | 3.8 |
| 46 | Terpolymer of Example 37 | 20 | 430 | 6.2 | 1.5 |
| 47 | Terpolymer of Example 38 | 20 | 250 | 5.7 | 3.2 |
| 48 | Terpolymer of Example 39 | 20 | 350 | 5.3 | 1.8 |
| 49 | Terpolymer of Example 40 | 20 | 220 | 5.8 | 3.8 |

CONTROL EXAMPLE 2 AND EXAMPLES 50 to 54

Blends of phenolic resin containing wood flour similar to Examples 41 and 42 were molded into ⅛" thick plaques and cured as previously described. The plaques were tested by a falling dart weighing ¼ lb. (Gardner Tester) to determine the height at which a crack appeared on the reverse side of the plaque. The results in Table IV show that the energy to break can be increased 2-3 fold, or more, depending on the structure of the polymer added.

TABLE IV

| Example Number | Additive Type | Additive Amount, % | Energy to Break Inch - Pounds |
|---|---|---|---|
| Control 2 | (Phenolic) | (25) | 1.2 |
| 50 | Tetrapolymer of Example 28 | 25 | 2.3 |
| 51 | Tetrapolymer of Example 26 | 25 | 3.2 |
| 52 | Tetrapolymer of Example 30 | 25 | 5.5 |
| 53 | Terpolymer of Example 31 | 25 | 5.5 |
| 54 | Terpolymer of Example 32 | | |

CONTROL EXAMPLE 3 AND EXAMPLES 55 to 59

A commercial grade of a phenolic resin is compounded specifically with medium length glass fiber filler and various additives for use in electrical applications. This composition is coded Durez ® 23570. Three tetrapolymers and two terpolymers were added to be 20 percent of the total composition. For comparison, 20 percent of a pure novalak phenolic resin was added to provide a control having the same amount of filler and additives. Samples were molded, cured and tested for electrical properties. In Table V it is shown that the electrical properties are not seriously impaired. The volume resistivity, however, is improved at least 5-fold.

EXAMPLES 60 to 62

Elastomeric, cured products can be made when the phenolic resin is less than 50% of the blend. Examples of such behavior are given in Table VI. Note that the % elongation to failure is 100-200%, and the elastic recovery of this elongation after failure is about 90%.

TABLE V

| EXAMPLE NUMBER | ADDITIVE TYPE | ADDITIVE AMOUNT % | ARC[1] RESISTANCE SECONDS | VOLUME[2] RESISTIVITY $\times 10^{11}$ OHM-METERS | BREAKDOWN[3] VOLTAGE VOLTS/MIL |
|---|---|---|---|---|---|
| Control 3 | (phenolic) | 20 | 108 | 0.23 | 1072 |
| 55 | Tetrapolymer of Example 28 | 20 | 81 | 14.5 | 1105 |
| 56 | Tetrapolymer of Example 26 | 20 | 140 | 2.2 | 1051 |
| 57 | Tetrapolymer of Example 30 | 20 | 119 | 2.5 | 1076 |
| 58 | Terpolymer of Example 31 | 20 | 101 | 8.1 | 1025 |
| 59 | Terpolymer of Example 32 | 20 | 107 | 1.2 | 994 |

[1] Tungsten electrodes
[2] ASTM D257
[3] ASTM D149 - Samples about 0.040 inch thick

TABLE VI

| Example No. | Phenolic Resin Used | Additive Type | Additive Amount, % | Stiffness 100% Secant Modulus, psi | Tensile Strength, psi | Elongation at Break, % | % Recovery After 30 Min. |
|---|---|---|---|---|---|---|---|
| 60 | Durez® 14000 | Tetrapolymer of Example 2 | 60 | 2710 | 3320 | 110 | 89 |
| 61 | Durez® 14000 | Tetrapolymer of Example 2 | 70 | 1540 | 2800 | 150 | 93 |
| 62 | Durez® 14000 | Tetrapolymer of Example 2 | 80 | 740 | 1960 | 190 | 92 |

CONTROL EXAMPLE 4 AND EXAMPLES 63 to 65

A commercial epoxy resin is filled with glass fibers and pelletized for injection molding uses (Fiberite® E 2748). Blends were made and evaluated as shown in Table VII.

TABLE VII

| Example No. | Additive Type | Additive Amount, % | Flexural Modulus $\times 10^{-3}$ psi | Flexural Strength $\times 10^{-3}$ psi | Flexural Strain to Failure, % | % Recovery | Izod Impact Strength Ft-lb/Inch |
|---|---|---|---|---|---|---|---|
| Control 4 | — | None | 1,440 | 16.2 | 1.1 | 100 | 0.39 |
| 63 | Tetrapolymer of Example 28 | 20 | 400 | 4.8 | 1.3 | 97 | 0.42 |
| 64 | Tetrapolymer of Example 26 | 20 | 210 | 5.0 | 3.8 | 90 | — |
| 65 | Tetrapolymer of Example 26 | 25 | 150 | 3.4 | 4.1 | — | 0.95 |

CONTROL EXAMPLE 5 AND EXAMPLES 66 to 69

Blends were made on a 2-roll mill using a glass-filled two-step phenolic resin (Durez® 23570). The resin contained sufficient catalyst for cure. Control Example 5 contained 20 percent of an unfilled phenolic resin so that all examples contain the same amount of glass filler. The polymers of this invention were added at the 20 percent level. Bars were molded at 100° C. and cured at 160° C. before testing.

From the results in Table VIII it can be seen that a desirable reduction in stiffness, a marked increase in flexural strain to failure, and a remarkable increase in impact strength can be obtained.

TABLE VIII

| Example Number | Additive Type | Additive Amount | Flexural Modulus $\times 10^{-3}$ psi | Flexural Strength $\times 10^{-3}$ psi | Flexural Strain to Failure | Izod Impact/Strength Ft-lb/inch |
|---|---|---|---|---|---|---|
| Control 5 | (phenolic) | 20% | 1400 | 14.7 | 1.2 | 0.20 |
| 66 | Terpolymer of Ex. 33 | 20% | 169 | 5.0 | 7.2 | 1.4 |
| 67 | Terpolymer of Ex. 34 | 20% | 73 | 2.7 | 8.0 | 1.6 |
| 68 | Terpolymer of Ex. 35 | 20% | 60 | 2.9 | 9.7 | 1.3 |
| 69 | Terpolymer of Ex. 36 | 20% | 124 | 4.9 | 5.8 | 1.1 |

CONTROL EXAMPLE 6 AND EXAMPLES 70 to 74

Blends were made on a 2-roll mill using a glass-fiber filled phenolic resin FM 1005 produced by the Fiberite Corporation. All examples contain 20 percent of the additive, including Control Example 6 so that all samples contain the same amount of the glass-fiber filler. Bars were molded at 100° C. and cured at 160° C. before testing.

From the results in Table IX it can be seen that one can obtain a combined increase in flexural strength, strain to failure and impact toughness if desired or a major increase in strain to failure and impact toughness at the expense of flexural modulus and flexural strength depending on the structure of the additive.

TABLE IX

| Example Number | Additive Type | Additive Amount % | Flexural Modulus, psi $\times 10^{-3}$ | Flexural Strength, psi $\times 10^{-3}$ | Flexural Strain To Failure % | Izod Impact Strength Ft-Lb/inch |
|---|---|---|---|---|---|---|
| Control 6 | Phenolic | 20 | 1580 | 12.8 | 0.95 | 0.16 |
| 70 | Example 28 | 20 | 920 | 14.6 | 1.9 | 0.26 |
| 71 | Example 26 | 20 | 160 | 5.8 | 5.5 | 1.4 |
| 72 | Tetrapolymer of Example 30 | 20 | 87 | 3.0 | 6.0 | 1.5 |
| 73 | Terpolymer of Example 31 | 20 | 106 | 3.2 | 6.0 | 2.1 |
| 74 | Terpolymer of Example 32 | 20 | 169 | 4.9 | 5.5 | 1.7 |

I claim:
1. Curable blends comprising by weight 1 to 99 per- cent of a free radical polymerized copolymer consisting essentially of, by weight (a) 40 to 90 percent ethylene; (b) 0 to 20 percent carbon monoxide; (c) 5 to 40 percent of a monomer copolymerizable therewith to provide flexible polymers, said monomer taken from the class consisting of unsaturated mono- or dicarboxylic acids of 3 to 20 carbon atoms, esters of said unsaturated mono- or dicarboxylic acids, vinyl esters of saturated carboxylic acids where the acid group has 1 to 18 carbon atoms, vinyl alkyl ethers where the alkyl group has 1 to 18 carbon atoms, acrylonitrile, methacrylonitrile, alpha-olefins of 3 to 20 carbon atoms, norbornene and vinyl aromatic compounds, and (d) 0.2 to 15 percent of an ethylenically unsaturated monomer of 4 to 21 carbon atoms containing an epoxy group; and 1 to 99 percent of an organic thermosetting resin with which said copolymer is only functionally compatible, said resin being selected from the group consisting of phenolic resins, epoxy resins, and melamine formaldehyde resins.

2. Curable blends according to claim 1 wherein monomer (c) is taken from the class consisting of vinyl esters of saturated carboxylic acids where the acid group has 1 to 18 carbon atoms, esters of unsaturated mono- or dicarboxylic acids of 3 to 20 carbon atoms and vinyl alkyl ethers.

3. Curable blends according to claim 2 wherein monomer (c) is vinyl acetate.

4. Curable blends according to claim 1 wherein monomer (d) is taken from the class consisting of epoxy esters of copolymerizable unsaturated organic acids, epoxy ethers of vinyl ethers, epoxy ethers of allyl ethers and mono-epoxy substituted di-olefins of 4 to 12 carbon atoms.

5. Curable blends according to claim 4 wherein monomer (d) is glycidyl methacrylate.

6. Curable blends according to claim 1 wherein monomers (a) to (d) are present in amounts by weight (a) 45 to 90 percent, (b) 0 to 15 percent, (c) 10 to 33 percent, and (d) 0.4 to 9 percent.

7. Curable blends according to claim 1 wherein monomers (a) to (d) are present in amounts by weight (a) 50 to 70 percent, (b) 7 to 18 percent, (c) 20 to 30 percent, and (d) 1 to 6 percent.

8. Curable blends according to claim 7 wherein monomer (c) is vinyl acetate and monomer (d) is glycidyl methacrylate.

9. Curable blends according to claim 7 wherein monomer (c) is vinyl acetate and monomer (d) is glycidyl acrylate.

10. Curable blends according to claim 1 wherein said thermosetting resin is a phenolic resin.

11. Curable blends according to claim 10 wherein said phenolic resin is a phenol formaldehyde resin.

12. Curable blend according to claim 1 wherein said thermosetting resin is an epoxy resin.

13. Curable blend according to claim 1 wherein said thermosetting resin is a melamine formaldehyde resin.

14. Curable blend according to claim 1 wherein the ethylene copolymer is present in the range of 5 to 95 percent by weight and the thermosetting resin is present in the range of 5 to 95 percent by weight.

15. Curable blend according to claim 1 wherein the ethylene copolymer is present in the range of 10 to 50 percent by weight and the thermosetting resin is present in the range of 50 to 90 percent by weight.

16. Curable blend according to claim 14 wherein said thermosetting resin is a phenolic resin.

17. Curable blend according to claim 16 wherein said phenolic resin is a novalak resin.

18. Curable blend according to claim 16 wherein said phenolic resin is a resole resin.

19. A cured blend according to claim 1 in the form of a molded article.

20. A cured blend according to claim 14 in the form of a molded article.

21. A cured blend according to claim 1 in the form of a film.

22. A cured blend according to claim 14 in the form of a film.

23. A cured blend according to claim 1 in the form of a fiber.

24. A cured blend according to claim 14 in the form of a fiber.

25. A cured blend according to claim 1 in the form of foam.

26. A cured blend according to claim 14 in the form of foam.

27. Curable blends according to claim 1 wherein said copolymer consists essentially of, by weight, 40 to 90 percent of monomer (a), 0 percent of monomer (b), 5 to 40 percent of monomer (c), and 0.2 to 15 percent of monomer (d) and wherein monomer (c) is taken from the class consisting of vinyl esters of saturated carboxylic acids where the acid group has 1 to 18 carbon atoms, esters of unsaturated mono- or dicarboxylic acids of 3 to 20 carbon atoms and vinyl alkyl ethers.

28. Curable blends according to claim 27 wherein monomer (c) is vinyl acetate.

29. Curable blends according to claim 27 wherein monomer (d) is taken from the class consisting of epoxy esters of copolymerizable unsaturated organic acids, epoxy ethers of vinyl ethers, epoxy ethers of allyl ethers and mono-epoxy substituted di-olefins of 4 to 12 carbon atoms.

30. Curable blends according to claim 29 wherein monomer (d) is taken from the class consisting of glycidyl methacrylate and glycidyl acrylate.

31. Curable blends according to claim 27 wherein monomers (a), (c) and (d) are present in amounts by weight (a) 45 to 90 percent, (c) 10 to 33 percent, and (d) 0.4 to 9 percent.

32. Curable blends according to claim 27 wherein monomers (a), (c) and (d) are present in amounts by weight (a) 50 to 70 percent, (c) 20 to 30 percent, and (d) 1.5 to 6 percent.

33. Curable blends according to claim 27 wherein the ethylene copolymer is present in the range of 5 to 95 percent by weight and the thermosetting resin is present in the range of 5 to 95 percent by weight.

34. Curable blend according to claim 27 wherein the ethylene copolymer is present in the range of 10 to 50 percent by weight and the thermosetting resin is present in the range of 50 to 90 percent by weight.

35. Curable blend according to claim 33 wherein the thermosetting resin is a phenolic novalak resin.

36. Curable blend according to claim 33 wherein the thermosetting resin is a phenolic resole resin.

37. A method for producing a molded article which comprises (1) dispersing 5 to 95 percent by weight of a free radical polymerized ethylene copolymer consisting essentially of, by weight (a) 40 to 90 percent ethylene; (b) 0 to 20 percent carbon monoxide; (c) 5 to 40 percent of a monomer copolymerizable therewith to provide flexible polymers, said monomer taken from the class consisting of unsaturated mono- or dicarboxylic acids of 3 to 20 carbon atoms, esters of said unsaturated mono- or dicarboxylic acids, vinyl esters of saturated carboxylic acids where the acid group has 1 to 18 carbon atoms, vinyl alkyl ethers where the alkyl group has 1 to 18 carbon atoms, acrylonitrile, methacrylontrile, alpha-olefins of 3 to 20 carbon atoms, norbornene, and vinyl aromatic compounds; and (d) 0.2 to 15 percent of an ethylenically unsaturated monomer of 4 to 21 carbon atoms containing an epoxy group, and 5 to 95 percent by weight of a thermosetting resin with which said copolymer is only functionally compatible, said resin being selected from the group consisting of phenolic resins, epoxy resins, and melamine formaldehyde resins, (2) molding said blend; and (3) maintaining said molded blend at an elevated temperature until a crosslinked resin is formed, said ethylene copolymer remaining substantially dispersed in the cured thermosetting resin.

38. A method according to claim 37 wherein monomer (c) is taken from the class consisting of vinyl esters of saturated carboxylic acids where the acid group has 1 to 18 carbon atoms, esters of unsaturated mono- or dicarboxylic acids of 3 to 20 carbon atoms and vinyl aromatic compounds.

39. A method according to claim 37 wherein monomer (c) is vinyl acetate.

40. A method according to claim 37 wherein monomer (c) is methyl acrylate.

41. A method according to claim 37 wherein monomer (c) is methyl methacrylate.

42. A method according to claim 37 wherein monomer (d) is taken from the class consisting of epoxy esters of copolymerizable unsaturated organic acids, epoxy ethers of vinyl ethers, epoxy ethers of allyl ethers and mono-epoxy substituted di-olefins of 4 to 12 carbon atoms.

43. A method according to claim 42 wherein monomer (d) is glycidyl acrylate.

44. A method according to claim 42 wherein monomer (d) is glycidyl methacrylate.

45. A method according to claim 42 wherein monomer (d) is glycidyl vinyl ether.

46. A method according to claim 37 wherein monomers (a) to (d) are present in amounts by weight (a) 45 to 90 percent, (b) 0 to 15 percent, (c) 10 to 33 percent, and (d) 0.4 to 9 percent.

47. A method according to claim 37 wherein monomers (a) to (d) are present in amounts by weight (a) 50 to 70 percent, (b) 10 to 15 percent, (c) 20 to 30 percent, and (d) 1.5 to 6 percent.

48. A method according to claim 46 wherein monomer (c) is vinyl acetate and monomer (d) is glycidyl methacrylate.

49. A method according to claim 47 wherein monomer (c) is vinyl acetate and monomer (d) is glycidyl acrylate.

50. A method according to claim 37 wherein said thermosetting resin is a phenolic resin.

51. A method according to claim 50 wherein said phenolic resin is a phenol formaldehyde resin.

52. A method according to claim 37 wherein said thermosetting resin is an epoxy resin.

53. A method according to claim 37 wherein said thermosetting resin is a melamine formaldehyde resin.

54. A method according to claim 37 wherein said ethylene copolymer consists essentially of, by weight, 40 to 90 percent of monomer (a), 0 percent of monomer (b), 5 to 40 percent of monomer (c), and 0.2 to 15 percent of monomer (d) and wherein monomer (c) is taken from the class consisting of vinyl esters of saturated carboxylic acids where the acid group has 1 to 18 carbon atoms, esters of unsaturated mono- or dicarboxylic acids of 3 to 20 carbon atoms and vinyl aromatic compounds.

55. A method according to claim 54 wherein monomer (c) is taken from the class consisting of vinyl acetate, methyl acrylate and methyl methacrylate.

56. A method according to claim 54 wherein monomer (d) is taken from the class consisting of epoxy esters of copolymerizable unsaturated organic acids, epoxy ethers of vinyl ethers, epoxy ethers of allyl ethers and mono-epoxy substituted di-olefins of 4 to 12 carbon atoms.

57. A method according to claim 56 wherein monomer (d) is taken from the class consisting of glycidyl acrylate, glycidyl methacrylate and glycidyl vinyl ether.

58. A method according to claim 54 wherein monomers (a), (c) and (d) are present in amounts by weight (a) 45 to 90 percent, (c) 10 to 33 percent, and (d) 0.4 to 9 percent.

59. A method according to claim 54 wherein monomers (a), (c) and (d) are present in amounts by weight (a) 50 to 70 percent, (c) 20 to 30 percent, and (d) 1.5 to 6 percent.

60. A method according to claim 54 wherein the ethylene polymer is present in the range of 10 to 50 percent by weight and the thermosetting resin is present in the range of 50 to 90 percent by weight.

61. A method according to claim 60 wherein the thermosetting resin is a phenolic novalak resin.

62. A method according to claim 60 wherein the thermosetting resin is a phenolic resole resin.

* * * * *